United States Patent [19]

Klüting et al.

[11] Patent Number: 4,530,481
[45] Date of Patent: Jul. 23, 1985

[54] SEAT RAIL

[75] Inventors: Bernd Klüting, Radevormwald; Peter Ebeling, Remscheid; Willibald Strowik, Remscheid-lennep, all of Fed. Rep. of Germany

[73] Assignee: Keiper Recarco GmbH & Co., Fed. Rep. of Germany

[21] Appl. No.: 503,552

[22] Filed: Jun. 13, 1983

[30] Foreign Application Priority Data

Nov. 6, 1982 [DE] Fed. Rep. of Germany ....... 3221959

[51] Int. Cl.[3] ............................................ A45D 19/04
[52] U.S. Cl. .................................... 248/394; 248/424
[58] Field of Search .............. 248/395, 394, 396, 397, 248/424; 297/328, 330, 325

[56] References Cited

U.S. PATENT DOCUMENTS

| 2,795,267 | 6/1957 | Williams | 248/394 |
|---|---|---|---|
| 2,795,267 | 6/1957 | Williams | 248/394 |
| 2,953,190 | 9/1960 | Tanaka | |
| 3,105,669 | 10/1963 | Pickles | 248/394 |
| 3,335,995 | 8/1967 | Pickles | 248/394 |
| 3,570,319 | 3/1971 | Arnold | 74/416 X |
| 3,692,271 | 9/1972 | Homier | 248/394 |
| 3,701,287 | 10/1972 | Kuiken | 74/416 X |
| 3,977,267 | 8/1976 | Graafsma | 74/416 |
| 4,190,225 | 2/1980 | Becker | 248/394 |
| 4,222,543 | 9/1980 | Becker | 248/394 |
| 4,285,487 | 8/1981 | Kazaoka et al. | 248/396 |
| 4,309,015 | 1/1982 | Muhr | 248/394 X |
| 4,325,527 | 4/1982 | Berneking | 248/396 X |
| 4,331,313 | 5/1982 | Pickles | 248/397 X |
| 4,333,627 | 6/1982 | Dembinski | 248/396 |

FOREIGN PATENT DOCUMENTS 2716549 10/1980 Fed. Rep. of Germany.
433044 8/1935 United Kingdom.

Primary Examiner—J. Franklin Foss
Attorney, Agent, or Firm—Wigman & Cohen

[57] ABSTRACT

A seat rail for vehicle seats, particularly motor vehicle seats, is formed as a housing in which at least one drive element of a seat adjustment device is arranged. A slide rail which serves the longitudinally movable adjustment is a guide rail is formed on the seat rail. Seat adjustment devices to control the height, longitudinal movement or the angle of inclination of the seat may be included in the seat rail.

16 Claims, 7 Drawing Figures

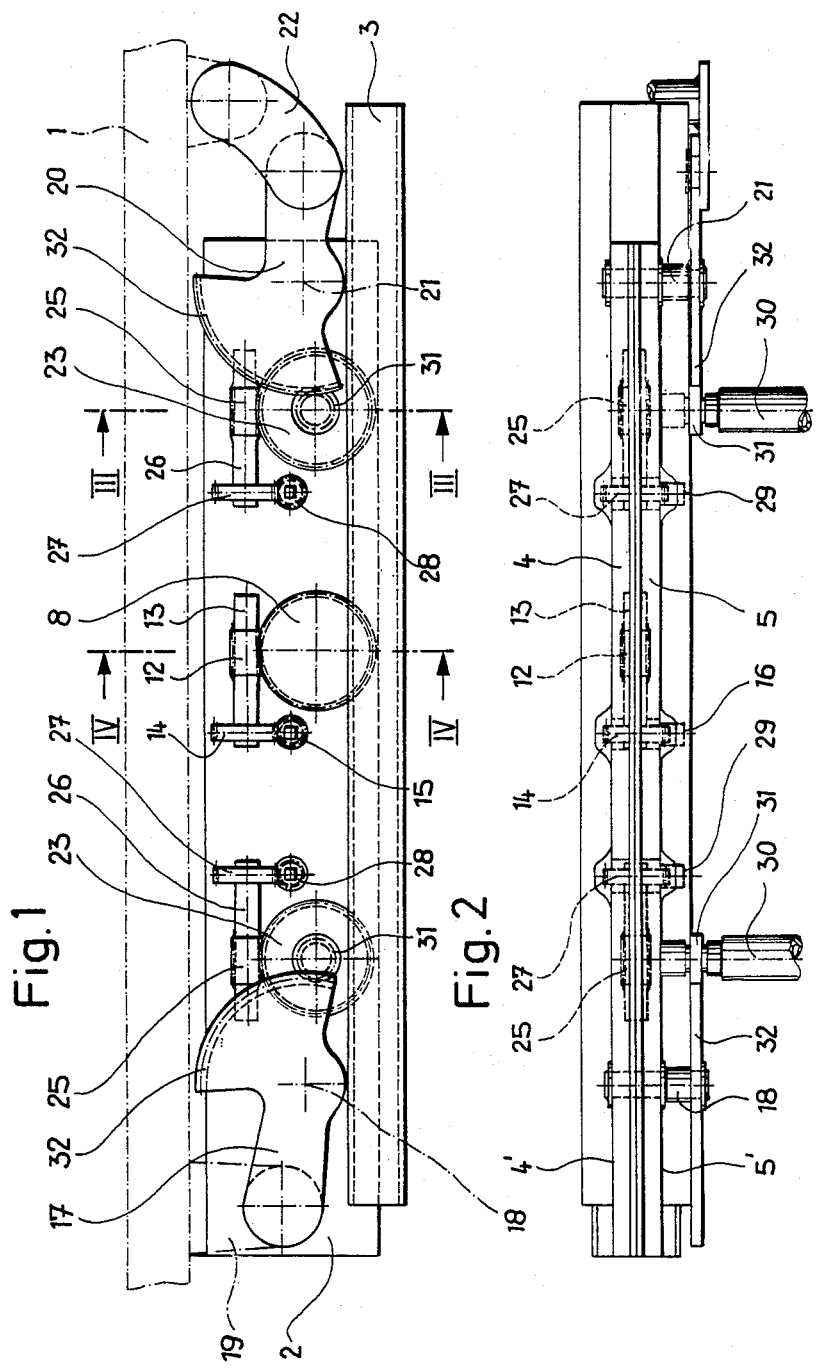

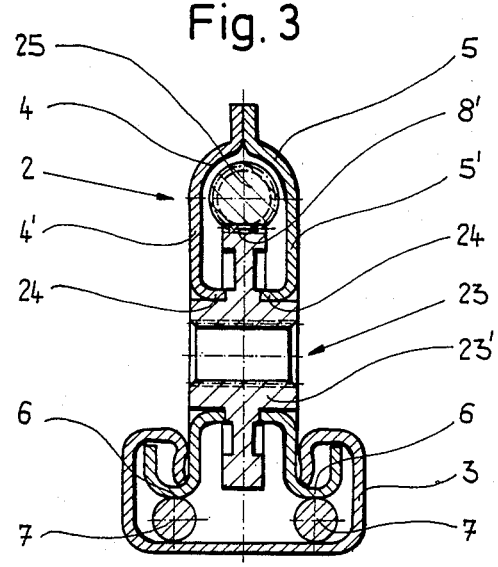
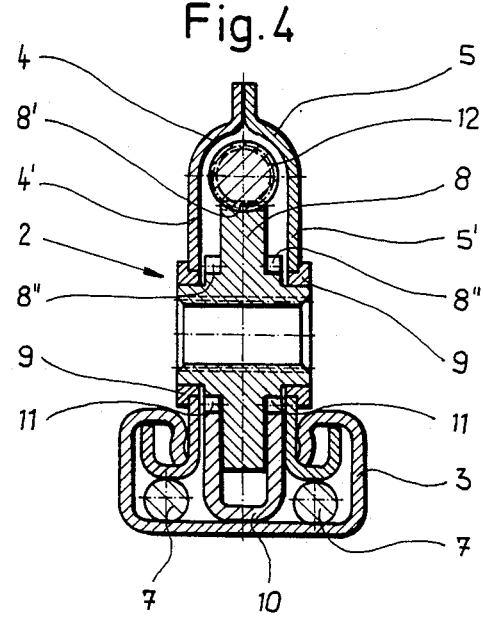

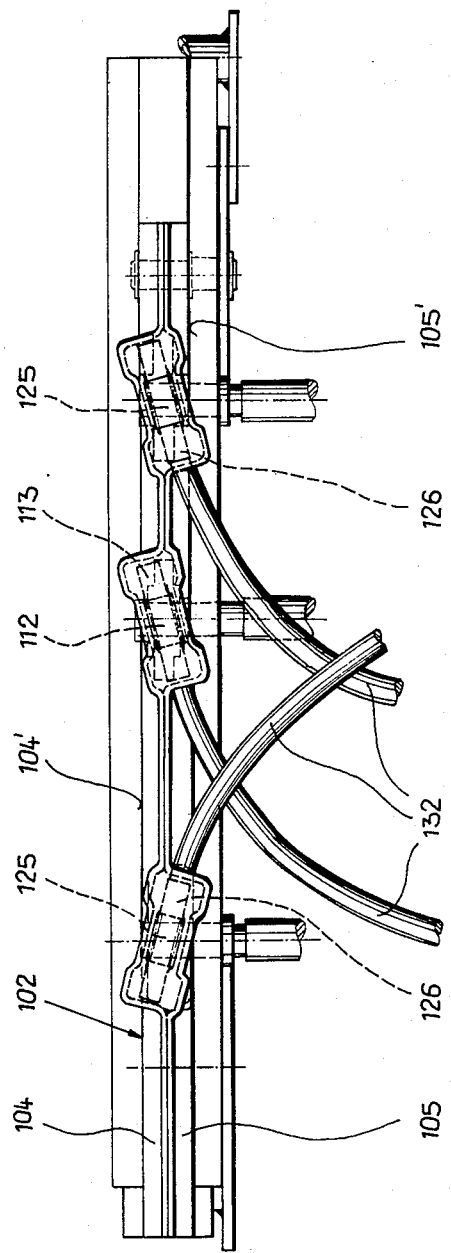

SEAT RAIL

BACKGROUND OF THE INVENTION

The present invention relates to a seat rail for vehicle seats, particularly for motor vehicle seats.

The known seat rails of this type, since they are required only to fulfill the functions of a longitudinal beam, are shaped rails stiffened with reinforcing creases and folds and are connected at their underside to the slide rail, which, in turn, cooperates with a guide rail. Often this seat rail also serves as a support for elements of a longitudinal seat adjustment device. If the seat includes a height and/or inclination device, then as a rule, elements of this adjustment device or devices are arranged on the sides of the seat rail. This joining together of individual structural elements requires a relatively large amount of space.

SUMMARY AND OBJECTS OF THE INVENTION

In view of the foregoing limitations and shortcomings of the prior art devices, as well as other disadvantages not specifically mentioned above, it should be apparent that there still exists a need in the art for a seat rail which does not require as much space as the prior art devices. It is, therefore, a primary objective of this invention to fulfill that need by providing a space efficient seat rail.

More particularly, it is an object of this invention to provide a seat rail that serves as a housing for certain elements of a seat adjustment device. It is another object of this invention to provide an inexpensive seat rail comprised of two half shells joined to form a hollow casing.

Briefly described, the aforementioned objects are accomplished according to the invention by forming the seat rail as a housing, in which at least a portion of the structural elements of the seat adjustment device or devices is arranged, the space required by the seat rail for stability is used for the housing of at least a portion of the seat adjustment device or devices, so that little or no additional space is required for them. It is also advantageous to house the elements of the seat adjustment devices inside the seat rail because these elements are thereby housed without any additional expense and space requirements. In addition, the space required for the seat rail according to the invention can be even further decreased by forming the slide rail as a part of the seat rail. This combination also decreases manufacturing costs.

In a preferred embodiment the seat rail is comprised of two half shells joined to form a hollow casing, the lower edges of which shells each form half of the seat rail. With half shells of this type, a seat rail can generally be produced more inexpensively then with a one-piece or multiple-piece construction using more than two pieces. This is especially true if the seat rail includes openings.

Preferably, both half shells are made of sheet metal, which can be inexpensively manufactured and connected to each other along their upper edge by spot welding.

In a preferred embodiment all gears and/or pivot levers of all the seat adjusting devices are rotatably mounted inside the seat rail. Openings are provided in the side walls of the seat rail, which serve in the mounting of axles lying perpendicular to the longitudinal direction of a seat supporting beam.

Preferably the seat rail includes laterally projecting surface areas for local expansion of the interior space and/or drawn-in areas of the lateral surfaces for local constriction of the inside spacial width. This also contributes toward reducing the required space to a minimum.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a longitudinal section through a first embodiment,

FIG. 2 is a top view of the first embodiment,

FIG. 3 is a cross section through the first embodiment at the point in FIG. 1 designated by the line III—III, FIG. 4 is a cross section through the first embodiment at the point in FIG. 1 designated by the line IV—IV, FIG. 5 is a top view of a second embodiment.

DETAILED DESCRIPTION OF A PREFERRED EMBODIMENT

Figure 6:
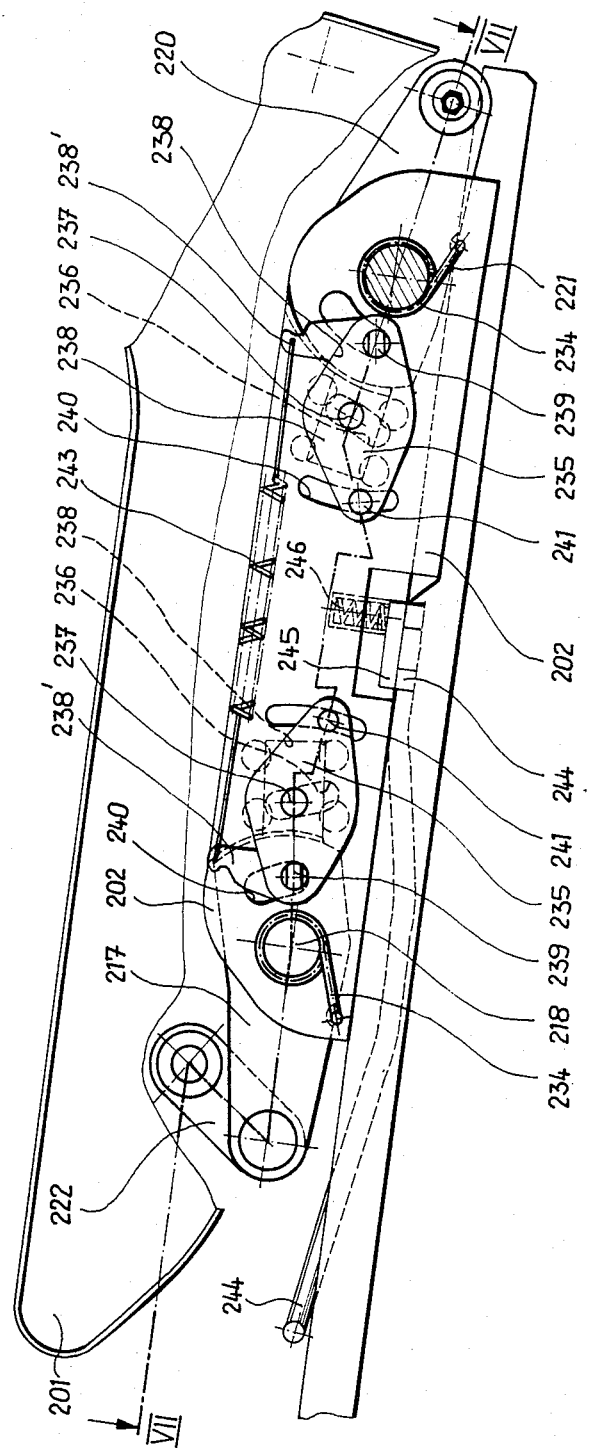
FIG. 6 is a side view of a third embodiment.

Referring now in detail to the drawings, like parts are designated by like reference numerals throughout.

A motor vehicle seat, of which only one longitudinal beam 1 of a frame-like seat support is shown in FIG. 1, is supported by two seat rails 2, which are formed as mirror-images. Since the rails 2 are so formed, only one of the two is described below and only the described seat rail is illustrated in the drawings. The two parallel seat rails 2 engage respective guide rails 3 in the assembled condition of the seat. The guide rails 3 are rigidly connected with the vehicle floor, either directly or by means of a console. These two identical guide rails 3, as shown in FIGS. 3 and 4, have a common cross-sectional shape, which differs from a U-shape in that the two upwardly directed shanks are bent inward and downward and each from a U-rail open toward the yoke portion of the guide rail.

As shown particularly in FIGS. 3 and 4, the seat rail 2 is formed as a housing which is open toward the guide rail 3 and is comprised of two mirror-image identical half shells 4 and 5. These two half shells 4 and 5, which are made of sheet metal and are formed as shaped rails, contact each other along their upper, flange-like edge and are rigidly connected at this point by spot welding. Aside from this flange-like edge, the two half shells 4 and 5 form a U-shaped cross section having parallel side walls. The spacing of these two side walls 4' and 5' from each other is selected such that the seat rails can engage in the longitudinal slot formed by the two U-rails of the guide rails 3 without a significant amount of play.

As shown in FIGS. 3 and 4, the lower edges of the two half shells 4 and 5 are bent outward and upward to form U-shaped rails. These two U-shaped rails together form a slide rail. 6. This slide rail 6 differs from the known slide rails, which are used together with guide rails whose cross-sectional shape is the same as that of the guide rail 3, only in that the known slide rails are not a separate structural unit, but are formed in one piece with the seat rail. The slide rail 6 therefore engages in a known manner with its U-shaped rails into the downwardly open U-rails of the guide rails 3 and rests on slide elements 7, which are placed into the guide rail 3 and are made of a plastic having good sliding characteristics.

For longitudinal seat adjustment a gear 8 having a rotational axis running horizontally and perpendicularly to the longitudinal direction of the seat rail 2 is arranged at a point approximately at the center of the seat rail 2. As shown in FIG. 4, openings lying concentrically to the rotational axis of the gear 8 are formed in the two side walls 4' and 5', and respective mounting bushings 9 are arranged in these openings. The gear 8 is mounted in these two mounting bushings 9 with a slight amount of play and has, in addition to a large diameter spur gear 8, respective smaller diameter spur gears 8'' at each side of the spur gear 8'. The spur gear 8' fits, as shown in FIG. 4, between the two parallel shanks of a U-rail 10, the yoke portion of which lies against the yoke of the guide rail 3 and is rigidly connected with the guide rail 3 at this point. The two equal length shanks of the U-rails, which lie symmetrically in the center plane of the guide rail 3, form respective spur racks 11 along their upwardly directed free edges. The two equal diameter spur gears 8'' mesh with these two spur racks 11, so that a rotation of the spur gear 8 results in a longitudinal shifting of the seat rail 2 relative to the guide rail 3. In order to be able to both rotate the spur gear 8 and lock it in any desired rotational position to prevent an unwanted longitudinal adjustment of the seat, the spur gear 8' is in engagement with a worm 12 which is arranged in the seat rail 2 with its shaft 13 running in the longitudinal direction of the seat rail 2 above the spur gear 8. Mounting elements (not shown) are rigidly connected to seat rail 2 to allow the rotatable but nonaxially movable mounting of the shaft 13. As shown in FIGS. 1 and 2, a worm gear 14 sits on the shaft 13 and a worm 15 is arranged therebeneath in the guide rail 3. In order not to limit the diameter of the worm gear 14 to the relatively narrow width of the guide rail 3, the two side walls 4' and 5' are expanded outward in the area of the worm gear 14, as shown in FIG. 2. These expanded portions, like the openings for the bushings 9, can be produced by pressing the two half shells 4 and 5, so as not to increase manufacturing costs. The axial length of the worm 15 is adapted to the distance of the side walls 4' and 5' from each other. For this reason, to mount this worm, openings in the two side walls 4' and 5' should be provided for mounting the shaft ends. One of the shaft ends 16 connects to the corresponding connection on the other seat rail and also to a drive means, which can be either a drive motor or a manual drive means. It would also be possible to attach a hand wheel, to the other shaft end in such a manner that a drive means could be connected to it.

Not only is the longitudinal seat adjustment device integrated into the seat rail 2 according to the invention, but a seat height and reclining adjustment device could also be integrated into rail 2. For the height and reclining adjustment of the seat, each of the two longitudinal beams 1 is pivotably connected near its front end with one end of a pivot lever 17, whereby both the pivot axis 18 of the pivot lever 17 and the axis of the articulated connection between it and the longitudinal beam 1 lie parallel to each other and run perpendicular to the direction of the seat support. As shown in FIG. 1, the pivot lever 17 is not directly hinged to the longitudinal beam 1, but rather to a strap 19 which is rigidly connected with the longitudinal beam 1 and extends downward therefrom. The pivot axis 18, which passes through the seat rail 2, is rigidly connected thereto. To permit the guide rail 3, which is wider than the seat rail 2, to lie outside the pivot range of the pivot lever 17, the pivot axis 18 is arranged inward so far over the seat rail 2 that the pivot lever 17, which is mounted so as to be rotatable thereon but be axially unshiftable, can be moved past the guide rail 3.

A second pivot lever 20, which is basically formed like the first pivot lever 17, is mounted near the rear end of the seat rail 2 on a pivot axis 21 so as to be rotatable but axially unshiftable. This pivot axis 21, like the pivot axis 18, holds the pivot lever 20 at a sufficient distance from the seat rail 2, passes through the same and is rigidly connected thereto. The rearwardly directed arm of the second pivot lever 20 is pivotably connected with a connecting strap 22, which is hinged at its other end to the longitudinal beam 1. In this embodiment it is hinged to a strap extending downward from the longitudinal beam. Like the pivot axis 21, the axes of both hinged connections lie horizontally and laterally to the longitudinal direction of the seat rail 2.

A clockwise pivotal movement of the first pivot lever 17, as viewed according to FIG. 1, causes the forward portion of the longitudinal beam 1 to rise, thereby changing the angle of inclination of the seat. Accordingly, a counter-clockwise pivotal movement of the second pivot lever 20, as viewed in FIG. 1, results in raising the rear portion of the longitudinal beam. A simultaneous or successive pivoting of both pivot levers 17 and 20 adjusts the height of the seat, and if performed by different adjustment amounts in the front and rear, also results in an adjustment of the seat inclination.

The two pivot levers 17 and 20 have identical pivot drives. As shown in FIG. 3, respective spur gears 23 having rotational axes lying parallel to the pivot axes 18 and 21 are arranged inside the seat rail 2. The side walls 4' and 5' are provided with openings for the mounting of these two spur gears 23. These openings are bordered by respective annular collars which project into the inside of the seat rail 2. These collars 24 serve as mounts for the hubs 23' of the two spur gears 23, as shown in FIG. 3, and also secure the spur gears 23 against axial shifting. As with the spur gear 8, respective worms 25 are arranged above the spur gears 23 inside the seat rail 2, said worms having their rotational axes running in the longitudinal direction of the seat rail and mounted in the seat rail 2 by mounting elements arranged therein (not shown). A shaft 26 supports not only the worm 25 which engages with the spur gear 23, but also a worm gear 27. Like the worm gear 14, respective expanded areas are provided in the side walls 4' and 5' for these two worm gears 27, in order to allow the diameter of the worm gears 27 to be larger than the distance of the two side walls from each other in the other areas, if desired. The drive of the two worm gears 27 is accomplished, like that of the worm gear 14, by means of respective worms 28, which are rotatably mounted beneath the worm gear in the seat rail 2 with their rotational axes lying perpendicular to the seat rail 2. The shaft ends 29 of the worms 28, project out of the seat rail and serve to provide a connection to a drive mechanism.

Respective shafts 30 are arranged in the hubs 23' of both spur gears 23 so as to rotate therewith and to be axially unshiftable, and to extend to the other seat rail, where they are coupled in the same manner with the corresponding spur gears 23, so that movement of the adjusting mechanism on one side will result in equal movement on the other side. On each of the two shafts 30 are arranged drive pinions 31, each of which mesh with a spur gear 32 on each associated pivot lever 17, 20. The spur gear 32 is arranged on the arm of the pivot lever, concentrically to the pivot axis that is not pivotably connected with the longitudinal beam 1 or the connecting strap 22.

The second embodiment illustrated in FIG. 5 differs from the above-described embodiment only by a somewhat different design of the drive devices. Therefore, corresponding elements are designated with reference numerals that are increased by 100 and the explanation is limited to the differing design. Otherwise, reference is made to the statements having to do with the first embodiment. The rotational axes of the worms 112 and 125, which engage with the spur gear which serves the longitudinal seat adjustment or the spur gears which serve the height and inclination adjustment, do not run in the longitudinal direction of the seat rail 102, but rather form an acute angle therewith, as shown in FIG. 5. The size of this angle corresponds with the angle of inclination of the worm. As shown in FIG. 5, this pivoted arrangement of the worms 112 and 125 in the seat rail 102 makes possible a direct connection of respective flexible shafts 132 to the worm shafts 113, 126, minimizing the expense for the drive.

The angular construction of the worms 112 and 125 requires the side walls 104' and 105' of the seat rail 102 to have local expanded areas and an opening for access to the worm shafts. The additional expense therefor is negligible, because the local deformations in the sheet metal necessary to form the expanded areas can be manufactured during the pressing of the half shells 104 and 105.

Figure 7:
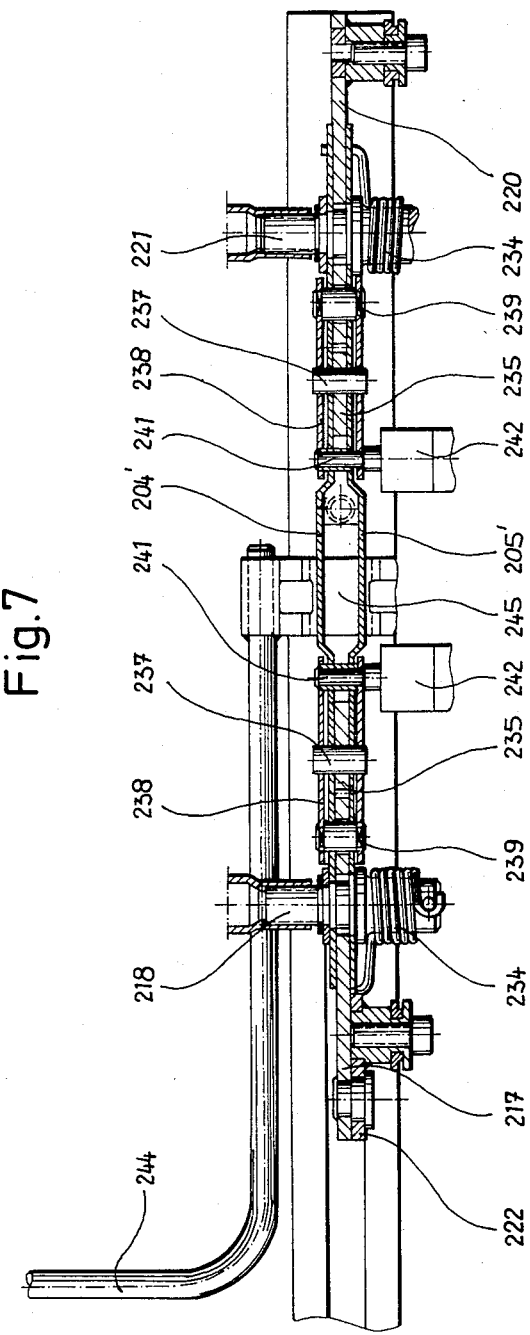
FIG. 7 is a section according to the line VII—VII in FIG. 6.

In the third embodiment illustrated in FIGS. 6 and 7, the seat rail 202 is formed in principle as in the previously described embodiments, i.e. it forms a downwardly open housing, which is comprised of two half shells which are connected with each other along their upper edges. The lower edges of the side walls 204' and 205' of the seat rail 202 formed by the two half shells form a slide rail for engagement in a guide rail of the above-described type.

Deviating from the above-described embodiments, the front and rear ends of the seat rail 202 are upwardly open, because respective pivot levers 217, 220 are arranged here between the two side walls. These pivot levers 217, 220 are arranged on shafts 218, 221 so as to rotate therewith, and the shafts 218, 221 pass through the seat rail 202 and are pivotably mounted therein. The arm of the pivot lever 217 which projects out of the front end is hinged to a connecting strap 222, which is hinged at the other end to the longitudinal beam 201 of a seat support. The arm of the pivot lever 220 which projects rearwardly from the seat rail 202 is hinged directly to the longitudinal beam 201, whereby the axes of all hinge connections run parallel to each other and perpendicular to the direction of the seat. Of course, as in the above-described embodiments, the connecting strap could also be associated with the rear pivot lever, just as in reverse, the connecting strap could also serve to provide the connection between the front pivot lever and the longitudinal beam in the embodiments according to the FIGS. 1 through 5.

Pre-biased helical springs 234 are disposed around both shafts 218 and 221. One end of each of these springs is fixed to the shaft supporting it and the other end forms an arm which engages beneath the associated pivot lever 217, 220. The helical springs 234 exert a torque on the associated pivot levers 217, 220 tending to raise the seat height, and this torque is strong enough to raise the seat with a decreased load.

The two pivot levers 217 and 220 therefore require only one locking device each, which are capable of locking them in the various pivot positions. These identically formed locking devices each include a locking slide 235, which is arranged inside the seat rail and is guided so that it can be moved translationally against the pivot axis of the associated pivot lever 217, 220. These locking slides 235, like the two pivot levers 217 and 220 and also the pivot levers of the previously described exemplary embodiments, can be plate-like stamped elements. The locking slides 235 include a toothed area along their edges facing the pivot lever, which teeth can enter into engagement with the teeth provided concentrically to the pivot lever axis at the free end of the arm of the pivot lever which is not hingedly connected with the connecting strap or the seat support.

The longitudinal movement of the locking slides 235 takes place with the aid of slots 236, in which respective guide pins 237 engage. These guide pins 237 also pass through the slides 237 and the side walls 204' and 205', which include slot-like openings necessary for the guide pins to be able to shift. Slots 236 are provided in two respective slot plates 238, which are arranged at both sides of the seat rail 202 in the vicinity of the locking slides 235. Each slot plate pair is pivotably mounted on a mounting pin 239 which passes through the seat rail 202. Because these mounting pins 239 are located near the associated pivot lever 217, 220, these pivot levers are provided with an arc-shaped slot 240 to accomodate the mounting pins. At the ends facing the other pair of slot plates the two associated slot plates are connected with each other by means of a bolt 241, which passes through an arc-shaped slot in the side walls 204' and 205'. The two bolts 241 each include a handle 242.

If the front hand grip 242 moves upward, then the associated pair of slot plates pivots counter-clockwise, as viewed according to FIG. 1, whereby the locking slide 235 associated with the pivot lever 217 moves downward and it thus rendered ineffective. The front of the seat can then be raised or lowered. Accordingly, an upward movement of the rear hand grip 242 makes possible a clockwise pivot movement, as viewed according to FIG. 6, of the associated pair of slot plates, whereby the locking slide 235 associated with the pivot lever 220 is rendered ineffective.

In order to guide the locking slide 235 back out of the release position into the locking position and to hold it there, the slot plates 238 have an upwardly extending arm 238'. Pre-biased return springs 243 are suspended by these arms.

The longitudinal seat adjustment is not accomplished with a motor, although, one could be provided. For this reason, only one locking device is provided, which includes a bar 244, arranged adjacent to the seat rail 202 and rotatable about its longitudinal axis. The front, bent end of this bar 244 supports a hand grip (not shown). A locking member 245 is rigidly arranged at the rear end section of the bar 244. The locking member 245 projects perpendicularly from the bar 245, passes through openings in the side walls 204' and 205' of the seat rail and has on its underside teeth or other detent elements, which may enter into form-fitting engagement with the teeth of a spur rack or with the detent elements of an otherwise formed detent rail. Preferably a pre-biased return spring 246 is arranged inside the seat rail, which spring 246 presses the locking member against the spur rack or the detent rail.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A seat rail for vehicle seats, particularly for motor vehicle seats comprising:
    a guide rail;
    a seat rail housing comprising two half shells joined together to form a hollow casing, each half shell having a lower edge, the lower edges of said half shells forming a slide rail, said seat rail housing being movable longitudinally in said guide rail;
    means for longitudinally adjusting the position of said seat rail, said adjusting means comprising a first gear mounted in said housing, second gears mounted on each side of said first gear in fixed relation thereto, and a toothed element mounted on said guide rail and enmeshed with said second gears; and
    means disposed in said housing for driving said first gear.

2. A seat rail according to claim 1, wherein said half shells are one-piece sheet metal elements.

3. A seat rail according to claim 1, wherein said half shells are connected to each other along their upper edges.

4. A seat rail according to claim 2, wherein said half shells are connected to each other along their upper edges.

5. A seat rail according to claim 1, further comprising at least one of a spur gear and a pivot lever having a toothed segment, said spur gear and pivot lever being rotatably mounted in openings in the side of said seat rail, the axes of said spur gear and pivot lever being perpendicular to said seat rail.

6. A seat rail according to claim 2, further comprising at least one of a spur gear and a pivot lever having a toothed segment, said spur gear and pivot lever being rotatably mounted in openings in the side of said seat rail, the axes of said spur gear and pivot lever being perpendicular to said seat rail.

7. A seat rail according to claim 3, further comprising at least one of a spur gear and a pivot lever having a toothed segment, said spur gear and pivot lever being rotatably mounted in openings in the side of said seat rail, the axes of said spur gear and pivot lever being perpendicular to said seat rail.

8. A seat rail according to claim 4, wherein said first gear comprises a large diameter spur gear mounted between two smaller diameter spur gears, said smaller diameter spur gears being adapted for engagement with two spur racks mounted on said guide rail, said larger diameter spur gear being mounted within and extending below the two half shells, and being in engagement with the driving means, said driving means comprising a worm arranged inside the seat rail.

9. A seat rail according to claim 8, wherein said half shells include laterally projecting surface areas.

10. A seat rail according to claim 9, wherein at least one spur gear is arranged in the vicinity of the laterally projecting surface areas of the seat rail, said one spur gear having a rotational axis forming an acute angle with the longitudinal axis of the seat rail, said seat rail having an opening in one of its side walls, said opening being aligned with one end of the shaft supporting said one spur gear.

11. The seat rail according to claim 1, wherein said first gear and driving means are disposed in a dividing plane of the casing.

12. The seat rail according to claim 11, wherein the shells are symmetrical.

13. The seat rail according to claim 1, wherein said first and second gears are spur gears, said first gear having a diameter greater than the diameter of said second gears.

14. A seat rail assembly for vehicle seats, particularly for motor vehicle seats, comprising:
    a guide rail adapted to be fixedly mounted to a vehicle;
    a seat rail comprising two half shells formed as a housing having a central dividing plane, said seat rail being slidably mounted for longitudinal adjustment relative to said guide rail; and
    means for adjusting said seat rail relative to said guide rail, said adjusting means comprising a rack mounted to said guide rail, a first gear mounted in said housing along the central dividing plane thereof, a pair of second gears mounted in said housing in fixed relation with said first gear on opposite sides thereof, and symmetrical to said central dividing plane, said second gears being enmeshed with said rack, and means for driving said first gear.

15. A seat rail assembly according to claim 14, wherein said rack is U-shaped in transverse cross-section to form two spaced, parallel upstanding elements having upper edges, said upper edges being toothed and enmeshed with said second gears.

16. A seat rail according to claim 14 wherein said seat adjustment device further comprises a toothed pivot lever and spur gear combination enclosed within said seat rail, whereby rotation of said combination adjusts the height of the vehicle seat.

* * * * *